(12) United States Patent
Burbage, Jr. et al.

(10) Patent No.: US 6,718,891 B1
(45) Date of Patent: Apr. 13, 2004

(54) ROW CONTROL SYSTEM FOR VACUUM OPERATED SEED PLANTER

(76) Inventors: David Burbage, Jr., 4305 Sidney Rd., Belhaven, NC (US) 27810; William S. Warren, 2283 Old New Bern Rd., Chocowinity, NC (US) 27817

( * ) Notice: Subject to any disclaimer, the term of this patent is extended or adjusted under 35 U.S.C. 154(b) by 0 days.

(21) Appl. No.: 09/922,269

(22) Filed: Aug. 6, 2001

(51) Int. Cl.[7] .................................................. A01C 7/00
(52) U.S. Cl. ....................................................... 111/177
(58) Field of Search ............................... 111/174, 177, 111/130, 200, 903, 904, 915; 221/211; 239/61, 63, 64, 65

(56) References Cited

U.S. PATENT DOCUMENTS

| | | | | |
|---|---|---|---|---|
| 4,300,461 A | * | 11/1981 | Hodge et al. | 111/34 |
| 4,970,973 A | * | 11/1990 | Lyle et al. | 111/127 |
| 6,070,539 A | * | 6/2000 | Flamme et al. | 111/177 |

* cited by examiner

*Primary Examiner*—Robert E. Pezzuto
(74) *Attorney, Agent, or Firm*—Mills Law Firm PLLC

(57) ABSTRACT

A seed planter having a plurality of vacuum operated seed metering units includes a valve assembly connected between the metering units and the vacuum manifold permitting discrete control of the operation of each metering unit.

12 Claims, 6 Drawing Sheets

ROW CONTROL SYSTEM FOR VACUUM OPERATED SEED PLANTER

FIELD OF THE INVENTION

The present invention relates to devices for planting seed, and, in particular, a control system for providing discrete row controlled planting of seed with air operated seed planters.

BACKGROUND OF THE INVENTION

Fluid actuated, air and vacuum, planters are frequently used in agriculture for the planting of individuals seeds in multiple rows in a single traverse of a field. Therein, the fluid activates a seed metering unit that drops one seed at a time into a furrow. For irregularly shaped fields or narrow plots or fields having waterways or other barriers precluding continuous planting, it is desirable to deactivate the planter at such row discontinuities in order to minimize the cost of overseeding.

Various approaches have been taken in the art to allow the planter operator to temporarily deactivate a bank of seed dispensers, generally by exiting the tractor and manually closing a valve to disable a portion of the planter. This inconvenience has resulted in seed planters that may be controlled by the operator from the tractor cab. In one system, the plants is provided with a mechanically based system using clutches for terminating rotation at the planter unit. The clutches are generally placed in the middle of the planter to disable one side of the unit. Plural clutches have been proposed to disable select portions of each side of the unit. The clutches, however, require permanent modification to the planter, and are costly to install and maintain. Further, the clutches disable the wheel driven drive shaft, and accordingly disable all feeder units between successive clutches, such that banks or four or more units are usually disabled. It has not been possible to disable only select planter units.

Certain fluid actuated planter units have a common manifold to which individual pneumatic lines are connected at each unit. As disclosed in U.S. Pat. No. 4,872,785 to Schrage et al, a butterfly valve in the manifold blocks the air flow to select portions, generally one side or the other or the outboard units on each side. The installation of such valve requires a costly permanent modification to the manifold. Also, bypass flow past the butterfly valve can maintain sufficient pressure or vacuum to prevent deactivation as desired, resulting in overseeding. The valves are typically arrayed to control multiple rows, rather than discrete rows, with the result that optimum seeding pattern cannot be realized.

In view of the foregoing, it would be desirable to provide a seed planter control systems that controls individual planting rows and row length, controlled from the tractor, and does not require extensive and costly modification of the planter structure.

BRIEF SUMMARY OF THE INVENTION

The present invention provide a row control system for a fluid operated seed planter wherein individual units can be enable or disabled by the operator without leaving the tractor. This is achieved by interposing actuator controlled ball valves in the feed lines between the individual units and the manifold. The valves are connected to a tractor control box whereat switches may be actuated to move the valves between open and closed positions. The control units do not require permanent modifications to the planter. The control units may be furnished in kit form, attached to existing structure with adaptive brackets, and connected using existing fluid lines. An operator may select a seeding pattern of individual rows and row length best suited for the field to be planted, thereby maximizing acreage and minimizing double seeding.

Accordingly, it is an object of the present invention to provide fluid actuated seed planter wherein planting individual rows may be selectively controlled by an operator.

Another object of the invention is to provide a vacuum operated seed planter wherein a supplemental valve is interposed between the vacuum source and individual row planters.

A further object of the invention is to provide a row controller for a seed planter that may be installed without structural modification, and using all existing components.

Yet another object of the invention is to provide a component package that may be utilized to provide a seed planter with discrete row planting control.

DESCRIPTION OF THE DRAWINGS

The above and other objects and advantages of the present invention will become apparent upon reading the following detailed description taken in conjunction with the accompanying drawings in which.

DETAILED DESCRIPTION OF THE PREFERRED EMBODIMENTS

Figure 1:
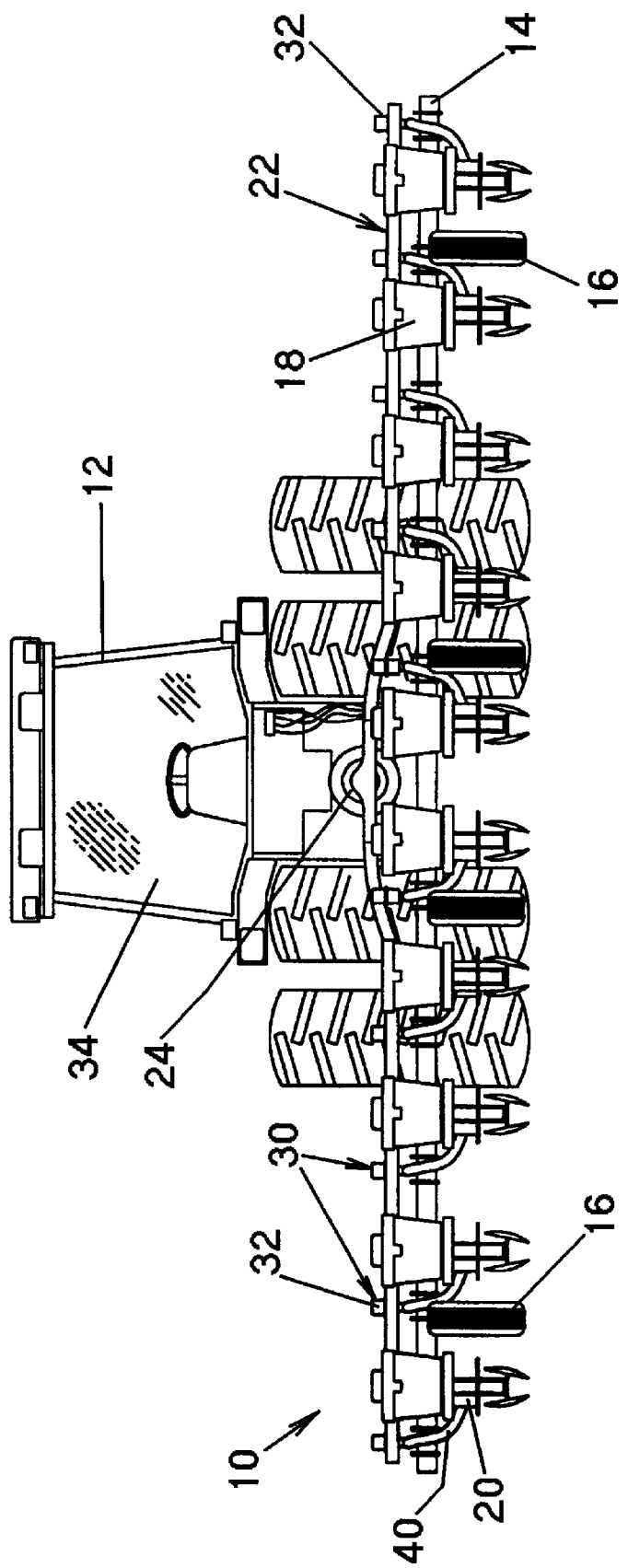
FIG. 1 is a rear view of a seed planter operated by a tractor and incorporating a planting row control system in accordance with an embodiment of the invention.
Figure 2:
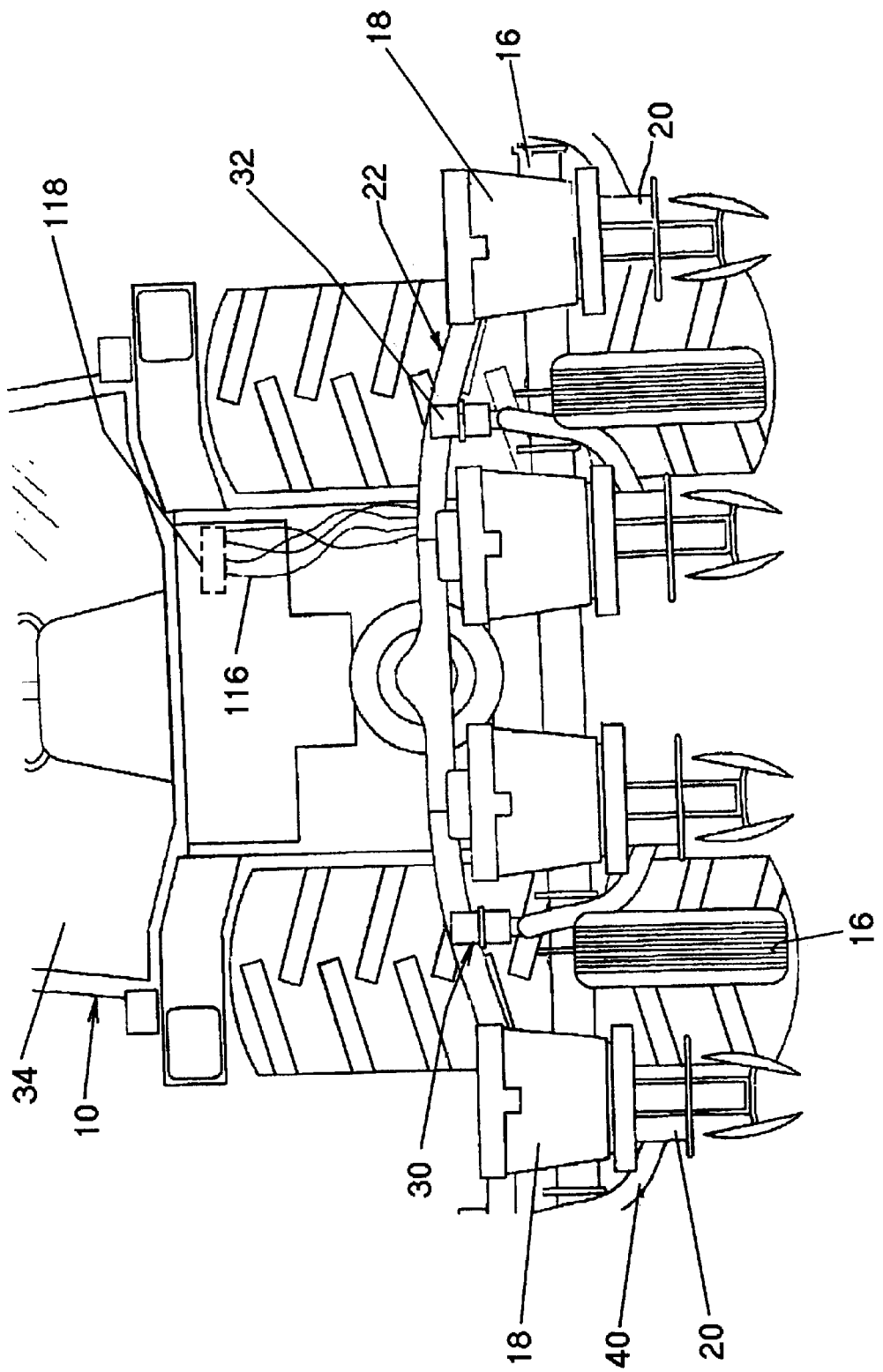
FIG. 2 is a fragmentary rear view of the seed planter and control system shown in FIG. 1.

Referring to the drawings for the purpose of illustrating a preferred embodiment and not for limiting same, FIG. 1 shows a seed planter 10 trailed behind a tractor 12. The planter 10 includes a frame 14 supported by a plurality of laterally spaced support wheel 16. A plurality of seed hoppers 18 are carried on the frame 14. The seed hoppers 18 are conventional vacuum operated units for dispensing seeds individually from individual seed metering units 20 under the control of a vacuum supplied through a manifold 22 connected to a vacuum pump 24 carried on the tractor 12. As hereinafter described in detail, the seed dispensing is discretely controlled at each hopper 18 for planting in desired rows plant row control system 30 including control units 32. The control units 32 selectively control the operability of each metering unit from the tractor cab 34 whereby the operator may remotely, and without leaving the tractor, select the seeding pattern appropriate for the field being planted. A suitable, commercially available planter for use with the present invention is the MaxEmergePlus Planters from John Deere.

Figure 3:
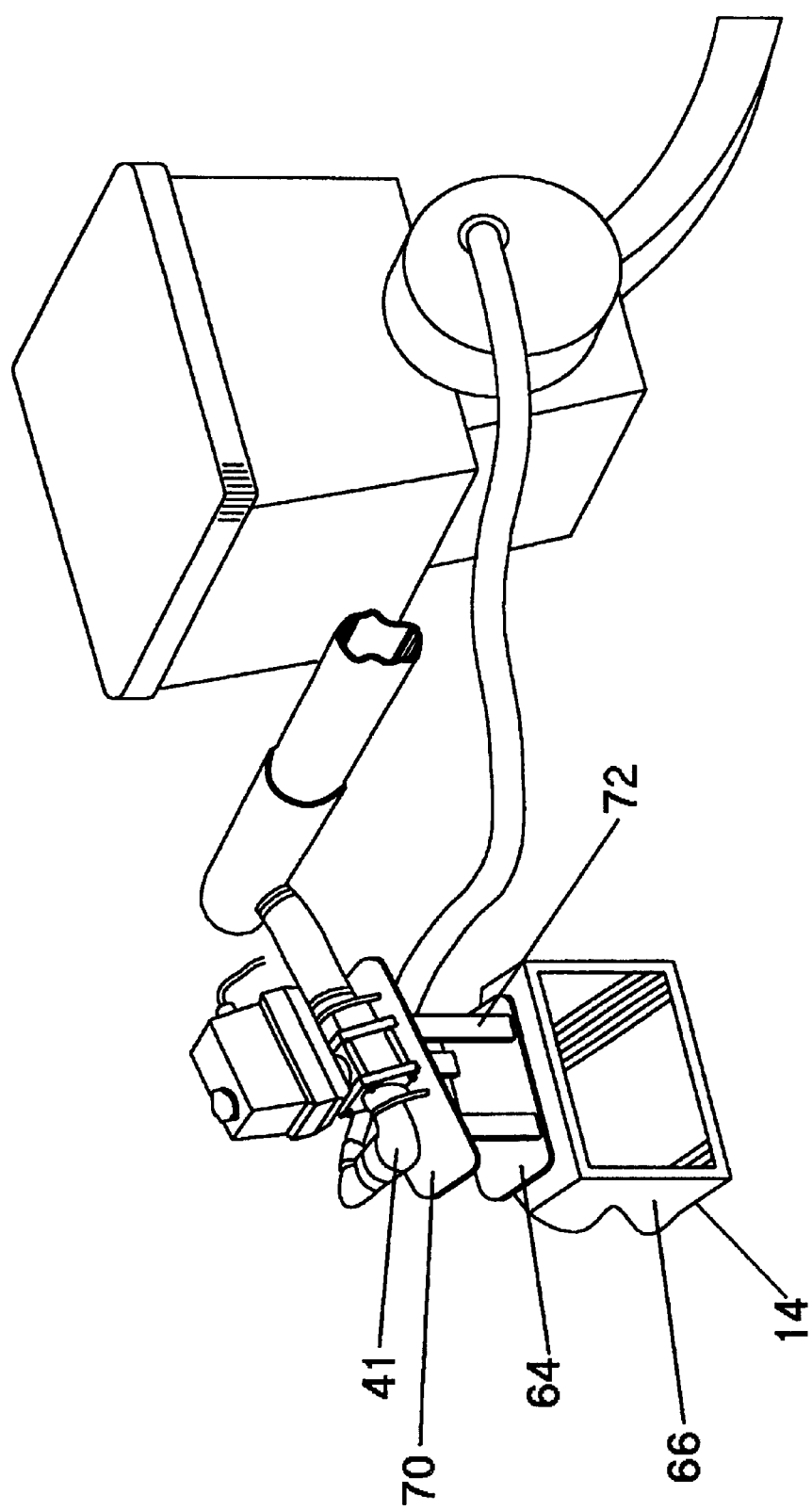
FIG. 3 is a fragmentary perspective view of the seed control unit of the present invention mounted on the planter frame and coupled with the seed metering unit.
Figure 4:
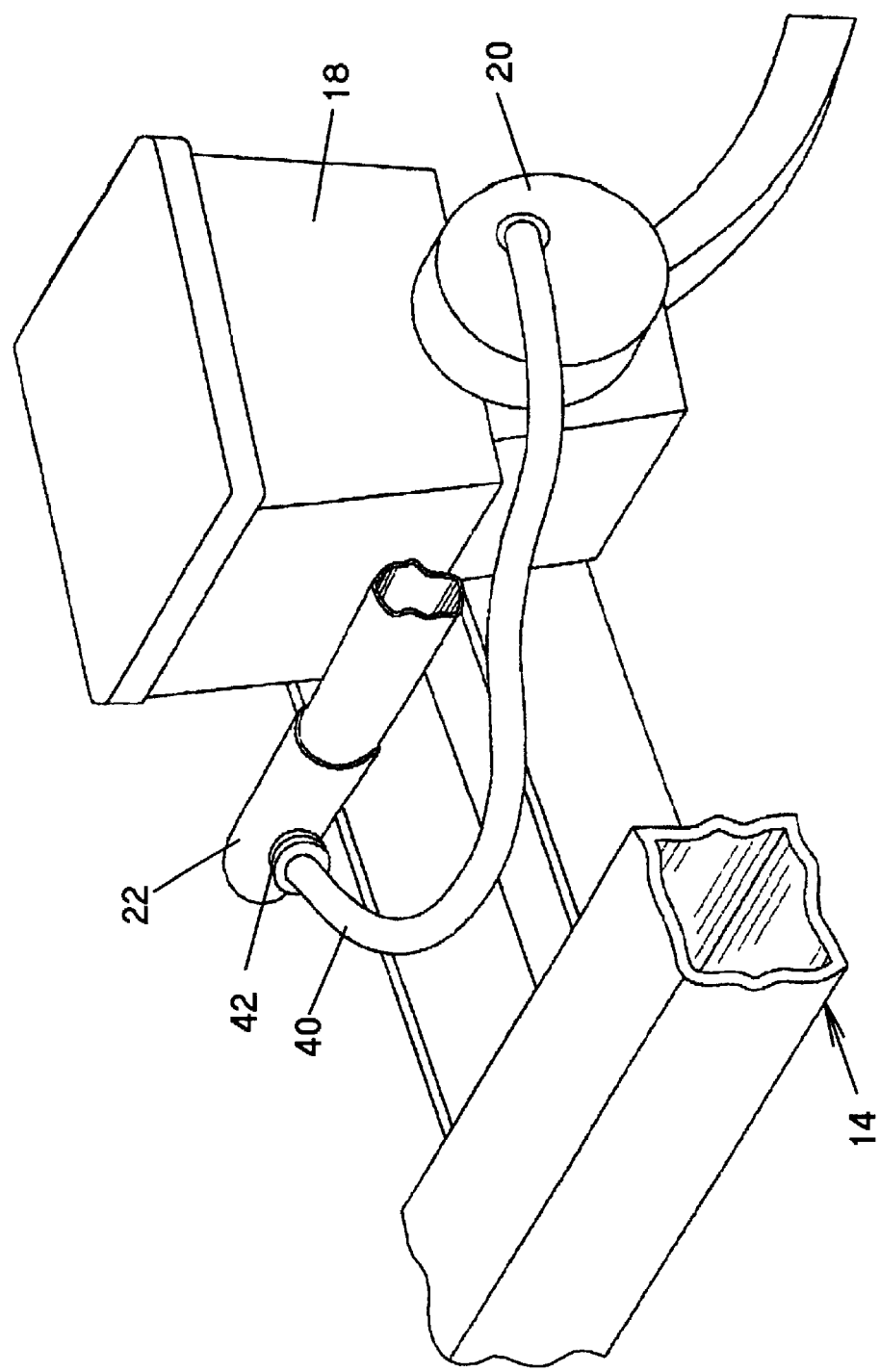
FIG. 4 is a fragmentary perspective view of a prior art vacuum systems for the seed planter.
Figure 5:
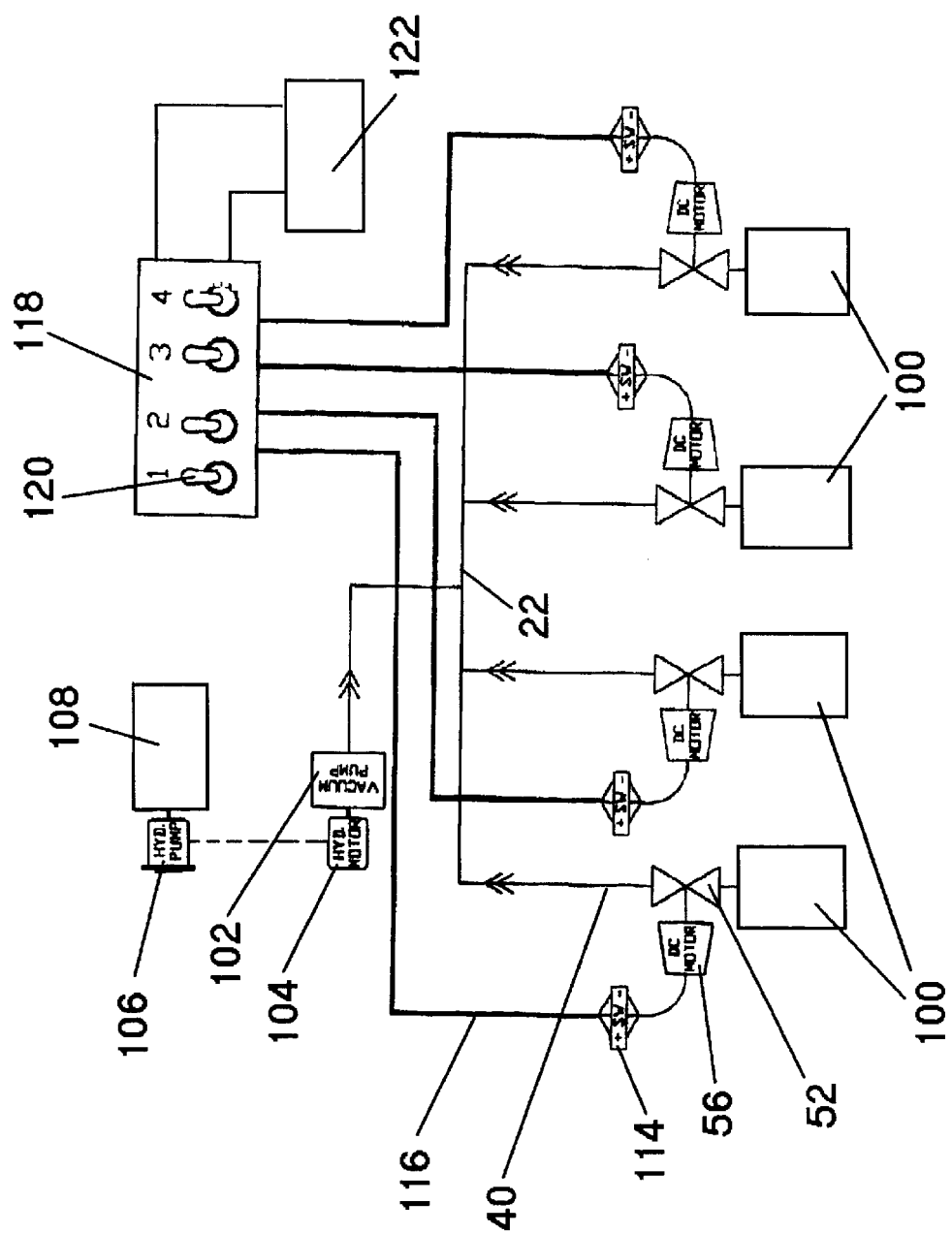
FIG. 5 is a schematic view of a control system for the seed control units.

The row control system 30 is adapted for a ready retrofit with existing planters. As shown in FIG. 4, a conventional planter includes a vacuum line 40 including an end cap 41 leading from a nipple 42 on the manifold 22 to the vacuum inlet 44 at the metering unit 20. Without modification or deletion and as shown in FIG. 3, the control unit 32 is carried on the frame 14 and fluidly interposed between the manifold 22 and the metering unit. The vacuum line 40 is connected to the outlet of the unit 32. The inlet line 50 of the unit 32 is connected to the existing nipple 42. The unit 32 includes a normally open ball valve 52 carried by a mounting bracket 54 attached to the frame 16. An electrical actuator 56 is conventionally operatively connected to the valve stem of the valve 52. The actuator is connected with a control system by cable 57, as described below. Select actuation of the valve moves the ball valve between an open position fluidly communicating the manifold 22 with the metering unit 20 and a closed position interrupting communication with the metering unit 20. The inlet line 50 is connected between the inlet port of the valve and the nipple 42 on the manifold, and a outlet port 62 connected at the end cap 41 of the vacuum line 40. The ball valve 52 is preferably a polypropylene unit provided with low friction seats and O-ring seals. The actuator 56 is preferably a direct current electrical actuator. The actuator 56 provides an activation time of about 1 second for a 1½ inch valve. In operation, valve opening will resume seed metering in a limited distance of about 10 to 20 feet. Valve closing will terminate seed metering in a considerable shorter distance and time.

The mounting bracket 54 includes a rectangular base plate 64 engaging the top surface of a cross beam 66 on the frame 14. The base plate 64 is attached to the frame 14 by U-bolts 68. A rectangular top plate 70 is inclined rearwardly and upwardly for alignment of the inlet line 50 with the nipple 42 on the manifold 22 and connected to the base plate 64 by support legs 72. The ball valve 52 is attached to the top plate 70 by U-bolts 71. It will be readily appreciated that the control unit 32 may be easily disposed on and removed from the frame 14 with conventional tools and without structural modification to planter components thereby allowing the control system to be transferred to new equipment for continued use. Further, if an individual control unit 32 is removed for repair or replacement, the line 40 may be removed and reattached to the nipple 42 for conventional operation.

Figure 6:
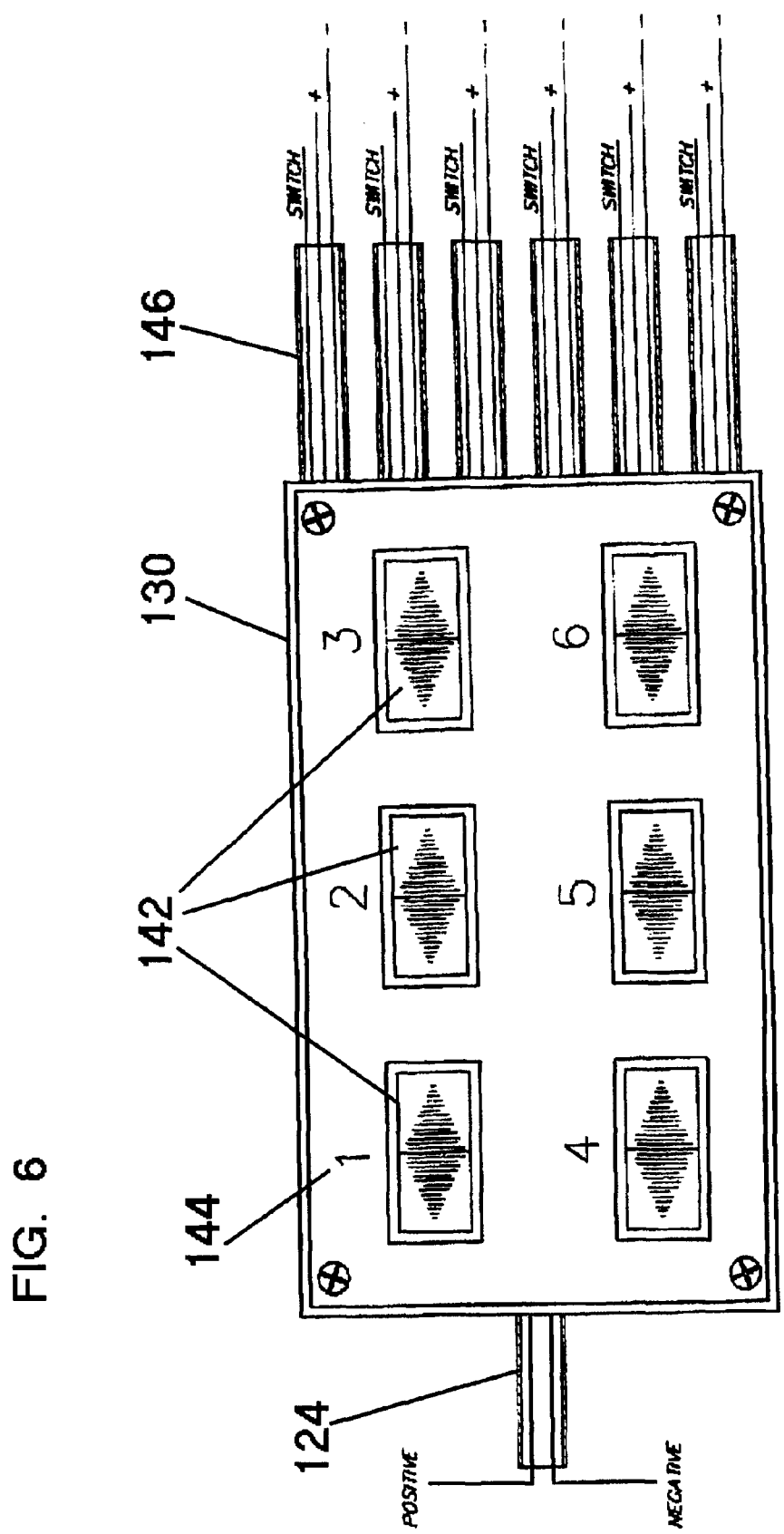
FIG. 6 is a front unit of a control box for the planting row control system of the invention.

Referring to FIG. 6, the control system 30 is schematically illustratively shown for descriptive purposes as controlling four vacuum planters 100. The planters 100 are connected by valve 52 by the vacuum lines 40 and the vacuum manifold 22. The vacuum manifold 22 is connected to vacuum pump 102 operated by hydraulic motor 104. The motor 104 is fluidly coupled with hydraulic pump 106 mechanically coupled with the tractor engine 108. The actuators are coupled to the stems of the valves 52 and electrically connected by unit cable 57 to connector 114 and by cable 116 to control box 118. The control box 118 includes four switches 120 for selectively actuating the valve actuators, and opening and closing the valving elements. The switches 120 are electrically connected to the tractor battery 122. The control box 118 is preferably located in the tractor cab 34 for convenient control by the tractor operator. Accordingly, as desired for optimum planting, the operator may selectively enable or disable discrete planters by appropriate actuation of the associated switch 120.

Referring to FIG. 6, the control box 130 may include a battery of illuminated switches 142 identified by indicia 144 for controlling operation of an associated metering unit through cable 146 and providing operator status through illumination thereat.

In operation, the operator determines the number of rows to be planted on the next traverse across the field and appropriately enables and disables the required metering units at the control box. The illumination of the selected switches confirms deactivation of the intended row unit. Valve closing interrupts unit vacuum and drops all seed from the planter carrier disc. About 10 to 30 feet before the end of the row, the operator establishes the planting patter for the succeeding row to permit sufficient time for the seed disc to be prepared for seeding.

Accordingly, it will be appreciated that the control system as described above may be connected with existing planter equipment without structural modification, and connected with existing vacuum, and electrical systems for operator control without exiting the tractor. Further, the control system may be removed and reattached to subsequent equipment, and the existing equipment reactivated merely by reattaching the unmodified vacuum line.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. A row control system for a seed planter: a transverse frame for coupling with a tractor; a plurality of seed metering units carried by and laterally spaced on the frame operated from a fluid source connected to an elongated manifold carried by and extending along said frame and having outlets adjacent each of said seed metering units; a first fluid line having one end fluidly connected with an associated outlet on the manifold; a plurality of valve members carried on the frame adjacent an outlet on the manifold; first means for fluidly connecting the other end of each first fluid line to an outlet of a valve member; second means for fluidly connecting an inlet of said valve member with an associated outlet on the manifold; actuator means for selectively moving each said valve member between an open position and a closed position; and control means operatively connected to said actuator means for selectively moving said valve member between said open position and said closed position.

2. The row control system as recited in claim 1 wherein said fluid source is a vacuum source.

3. The row control system as recited in claim 2 including means for releasably attaching said valve member to the frame member.

4. The row control system as recited in claim 3 wherein said valve member is a ball valve.

5. The row control system as recited in claim 4 wherein said valve member has a normally open condition.

6. The row control system as recited in claim 4 wherein said actuator means is an electric actuator.

7. The row control system as recited in claim 5 including a bracket member connected to said valve member and connected to the frame member with said inlet of said valve member aligned with said outlet of said manifold.

8. The row control system as recited in claim 4 wherein said control means includes switching means adapted to be carried on said tractor.

9. The row control system as recited in claim 8 wherein said switching means includes illumination means for determining the position of the valve member.

10. In a seed planter characterized by a plurality of seed metering units mounted on a transverse frame and operatively connected to a fluid source connected to a fluid manifold extending along the frame and provided with outlets adjacent each metering unit and a fluid line having a first end normally connecting with an outlet on the manifold and a second end connecting with a seed metering unit, a control system comprising: a plurality of valves carried on said frame adjacent each outlet, each valve having a valve inlet for fluid coupling with an outlet on said manifold and a valve outlet for fluid coupling with said first end of said fluid line; and control means for selectively moving each valve member between an open position and a closed position.

11. In a seed planter having a transverse frame carrying a plurality of seed metering units operated through a manifold extending along the frame wherein said manifold has a plurality of manifold outlets adjacent the metering units and wherein a fluid line has a first end connected to an outlet of the manifold and a second end connected to a metering unit, a method for controlling the operation of the metering units comprising the steps of:
  disconnecting said first end of said fluid line from said manifold outlet;
  attaching a valve member to said frame; connecting an inlet of said valve member to said manifold outlet; reconnecting said first end of said fluid line to an outlet of said valve member; and providing control means for selectively actuating said valve member between and open position and a closed position.

12. The method as recited in claim 11 including the step of disconnecting said first end of said fluid line from said outlet of said valve member and reconnecting said first end to said manifold outlet.

* * * * *